(12) United States Patent
O'Donnell et al.

(10) Patent No.: US 9,109,564 B2
(45) Date of Patent: Aug. 18, 2015

(54) ENGINE STARTING STRATEGY TO AVOID RESONANT FREQUENCY

(75) Inventors: Timothy M. O'Donnell, Germantown Hills, IL (US); Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 487 days.

(21) Appl. No.: 13/545,527

(22) Filed: Jul. 10, 2012

(65) Prior Publication Data

US 2014/0014459 A1    Jan. 16, 2014

(51) Int. Cl.
*B60W 10/02* (2006.01)
*F02N 11/08* (2006.01)
*B60W 10/08* (2006.01)

(52) U.S. Cl.
CPC .............. *F02N 11/08* (2013.01); *B60W 10/02* (2013.01); *B60W 10/08* (2013.01); *F02N 2200/022* (2013.01)

(58) Field of Classification Search
CPC ....... B60W 10/02; B60W 10/08; F02N 11/08; F02N 2200/022
See application file for complete search history.

(56) References Cited

U.S. PATENT DOCUMENTS

| 6,997,156 | B2 | 2/2006 | Tanei et al. |
| 8,116,957 | B2 | 2/2012 | Oh et al. |
| 2002/0103055 | A1* | 8/2002 | Tani et al. ..................... 477/115 |
| 2008/0251303 | A1 | 10/2008 | Rouaud et al. |
| 2009/0233766 | A1 | 9/2009 | Kadota |
| 2011/0118078 | A1 | 5/2011 | Kraska et al. |

* cited by examiner

*Primary Examiner* — Huan Le
(74) *Attorney, Agent, or Firm* — Leydig, Voit & Mayer, Ltd.

(57) ABSTRACT

A machine comprising a clutch that engages and disengages. The machine includes an engine operable at various engine speeds including a resonant frequency engine speed, and a transmission connected to the engine through the clutch. The engine applies power to the transmission when the clutch is engaged, and the engine does not apply power to the transmission when the clutch is disengaged. The machine comprises an engine starter that applies power to the engine, and an electronic control module that controls the clutch to disengage when the engine starter applies power to the engine and to engage after the engine speed exceeds the resonant frequency engine speed.

17 Claims, 3 Drawing Sheets

ENGINE STARTING STRATEGY TO AVOID RESONANT FREQUENCY

TECHNICAL FIELD

This patent disclosure relates generally to engines and, more particularly, to starting engines.

BACKGROUND

Engine driven machines can experience resonance when the vibration frequency of the driving part, such as a motor or engine, matches the mechanical resonant frequencies of the components of the machine. Many large machines experience resonant frequencies within the powertrains as a result of vibration caused by the speed output of an engine as the cylinders of the engine go through the combustion cycle. At certain engine speeds that correspond to resonant frequencies, the amplitude of the torque applied to the component parts increases dramatically, which can damage mechanical components of a machine. Engineers have learned to design power systems so that the resonant frequencies in the powertrain occur at engine speeds outside the normal operating range of a particular machine to avoid damage.

Though not seen in the normal operating range of the machine, resonant frequencies can still occur during lower start-up engine speeds as the engine attempts to overcome the large inertial forces required to rotate large machine components and parasitic load caused by pump drag, engine friction, and other non-inertial loads. Achieving an engine speed above which machine components experience resonance is particularly difficult in cold weather, when an engine can fail to speed up successfully through the resonant frequency engine speeds.

SUMMARY

The disclosure describes, in one aspect, a machine comprising a clutch adapted to engage and to disengage. The machine includes an engine operable at various engine speeds including a resonant frequency engine speed, and a transmission operatively connected to the engine through the clutch. The engine is adapted to apply power to the transmission when the clutch is engaged, and the engine is adapted to not apply power to the transmission when the clutch is disengaged. The machine also comprises an engine starter adapted to apply power to the engine, and an electronic control module configured to control the clutch to disengage when the engine starter applies power to the engine and to engage after the engine speed exceeds the resonant frequency engine speed.

In another aspect, the disclosure describes a method of starting a machine, the method comprising providing an engine operable at various engine speeds, including a resonant frequency engine speed, and operatively connecting an engine starter to the engine. The engine starter is adapted to apply power to the engine. The method also comprises operatively connecting a transmission to the engine through a clutch. The engine is adapted to apply power to the transmission when the clutch is engaged, and the engine is adapted to not apply power to the transmission when the clutch is disengaged. The method includes disengaging the clutch when the engine starter applies power to the engine, and engaging the clutch after the engine speed exceeds the resonant frequency engine speed.

In yet another aspect, the disclosure describes a method of starting a machine comprising providing an engine operable at various engine speeds including a resonant frequency engine speed. The method also includes operatively connecting an engine starter that is adapted to apply power to the engine, and operatively connecting a transmission to the engine through a clutch. The engine is adapted to apply power to the transmission when the clutch is engaged, and the engine is adapted to not apply power to the transmission when the clutch is disengaged. The method comprises operatively connecting a hybrid motor to the transmission. The method also comprises applying power to the transmission with the hybrid motor when the engine starter applies power to the engine until at least a time when the engine speed exceeds the resonant frequency engine speed, disengaging the clutch when the engine starter applies power to the engine, and engaging the clutch after the engine speed exceeds the resonant frequency engine speed.

DETAILED DESCRIPTION

Figure 1:
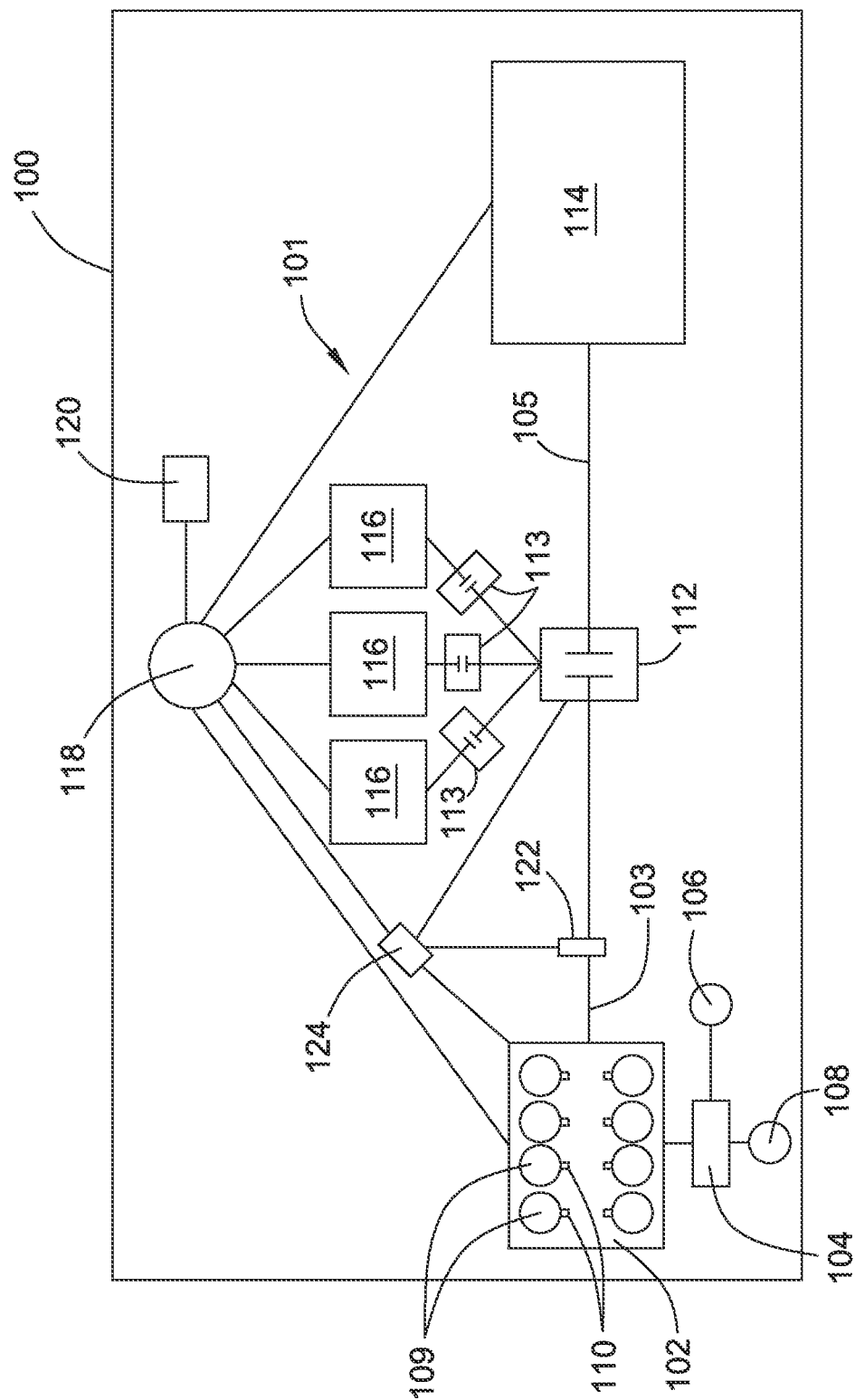
FIG. 1 is a schematic illustration of a machine in accordance with the disclosure.

This disclosure relates to methods of implementing an engine starting strategy for a machine 100 that avoids subjecting the machine and its components to the damaging effects of resonant frequencies occurring in the machine's powertrain. As illustrated schematically in FIG. 1, the machine 100 has a powertrain 101 that includes components such as an engine 102, a crankshaft 103, a clutch 112, a clutch shaft 105, auxiliary mechanisms 116, and a transmission 114. The powertrain 101 can also include other components not illustrated herein. In the illustrated embodiment, an engine starter 104 is connected to the engine 102. The engine starter 104 can be an electric motor engaged by the machine's 100 ignition switch 106, but could also be any suitable kinetic energy source capable of starting an engine. The engine starter 104 is connected to an electronic power source 108 such as a battery or other electronic storage, that supplies the engine starter with electric power. The engine 102 can also have injectors 110 that inject fuel, air, or other materials into the engine cylinders 109 for combustion. The embodiment schematically represented in FIG. 1 shows an engine 102 with eight cylinders 109 and eight injectors 110, though any number of injectors or cylinders is contemplated, and each cylinder can have more than one injector depending on the specific engine design. Pistons inside the cylinders 109 are connected to a crankshaft 103. The crankshaft 103 rotates as a result of the combustion within the cylinders 109 and corresponding piston oscillation.

The clutch 112 connects the engine 102 to the transmission 114 between the crankshaft 103 and the clutch shaft 105, with the crankshaft connecting the engine to the clutch, and the clutch shaft connecting the transmission to the clutch. The clutch 112 can be engaged or disengaged either automatically by an electronic control module 124 or by the machine 100 operator. Engaging the clutch 112 locks the crankshaft 103 and the clutch shaft 105 so that both rotate substantially at the same rate, applying power from the engine 102 to other components. When the clutch 112 is engaged, the engine 102 can apply power to the transmission 114. When the clutch 112 is disengaged, no power from the engine 102 is applied to the transmission 114 because the clutch does not transfer crankshaft 103 rotation to the clutch shaft 105.

In some embodiments, the clutch 112 also connects the engine 102 to auxiliary mechanisms 116. Auxiliary mechanisms 116 can be compressors, pumps for coolant, oil and other fluids, compressors, or any other mechanisms the machine 100 uses that require power. In such embodiments, engaging and disengaging the clutch 112 enables and disables, respectively, the application of power from the engine 102 to the auxiliary mechanisms 116. While the embodiment illustrated in FIG. 1 shows three auxiliary mechanisms 116, it is contemplated that any number of auxiliary mechanisms can be included. In other embodiments, it is contemplated that additional auxiliary clutches 113 separate from the clutch 112 can connect the engine 102 to the auxiliary mechanisms 116. In such embodiments, the auxiliary mechanisms 116 can be connected or disconnected from the engine 102 independently of whether the transmission 114 is connected or disconnected from the engine. The embodiment in FIG. 1 shows auxiliary clutches 113 between the auxiliary mechanisms 116 and the clutch 112; however, the auxiliary clutches can also be located between the engine 102 and the clutch, or bypass the clutch altogether by connecting the engine directly to the auxiliary mechanisms with the auxiliary clutches.

The machine 100 also includes a hybrid motor 118 that, in some embodiments, is connected to the transmission 114, auxiliary mechanisms 116, the engine 102, or any other powertrain 101 components. The hybrid motor 118 can apply power to the powertrain 101 components separately from or in addition to the engine 102, depending on whether the clutch 112 is engaged or disengaged, as is described in greater detail below. In some embodiments, the hybrid motor 118 receives energy from a stored energy source 120. The stored energy source 120 stores energy from a direct source, such as an electrical grid, or energy generated by the vehicle. The hybrid motor 118 uses the stored energy to apply power to powertrain 101 components. Although not shown in the figures, it is contemplated that additional clutches can separate the hybrid motor 118 from the powertrain 101 components. In such embodiments, the additional clutches engage and disengage to allow the hybrid motor 118 to apply power to certain powertrain 101 components and not other powertrain components at a given time, or apply power to all or none of the power train components at a given time.

To start the engine 102 in some embodiments, triggering the ignition switch 106 completes a circuit that allows electricity to flow from an electric power source 108 to the engine starter 104. The electric power source 108 can be a battery, a hard electrical line, or any other suitable source of electricity. The engine starter 104 converts the electric power from the electric power source 108 into kinetic energy to begin cycling the engine 102. At a certain point after the ignition switch 106 is triggered, the injectors 110 begin injecting fuel and air into the engine's 102 cylinders 109 to begin and maintain the combustion process. Pistons in the cylinders 109 oscillate in response to the combustion process and rotate the crankshaft 103. The rotating crankshaft 103 applies power to the powertrain 101 components to overcome resistant inertial forces and the parasitic load of those components and cause them to rotate. Parasitic load can result from pump drag, engine friction, or other non-inertial loads on the engine.

The speed of the engine 102 can be described as the number of revolutions the engine causes the crankshaft 103 to make per minute (RPM). The engine 102 is capable of outputting a wide range of engine speeds. At certain engine 102 speeds, the vibration frequency caused by the engine can match the powertrain's 101 mechanical resonant frequencies. At these resonant frequency engine 102 speeds, the powertrain 101 components can experience large amplitudes of torque, which can damage the components. Similarly, the vibration frequency caused by the transmission 114 as it rotates can cause resonance in the powertrain 101. The transmission 114 speeds that cause resonance are identified as resonant frequency transmission 114 speeds in this disclosure.

The rotational speed of the powertrain 101 components may be determined using rotary encoders or other suitable rotation sensors. The embodiment illustrated in FIG. 1 shows a rotary sensor 122 connected to the electronic control module 124. The electronic control module 124 may also be connected operatively to both the engine 102, the hybrid motor 118, and the clutch 112, and is configured to control the activity of those and other components. Some embodiments may implement additional sensors, such as torque sensors, that measure the torque levels experienced by the powertrain 101 components and communicate those levels back to the electronic control module 124. The torque levels caused by the engine 102 applying power to the powertrain 101 are engine torque levels, and the torque levels caused by the hybrid motor 118 applying power to the powertrain are hybrid torque levels. Hybrid torque sensors 123 can sense the hybrid torque levels, and engine torque sensors 125 can sense the engine torque levels. The engine torque sensors 125 are operatively associated with the electronic control module 124 and adapted to send signals indicative of the engine torque levels to the electronic control module. The hybrid torque sensors 123 are also operatively associated with the electronic control module 124 and adapted to send signals indicative of the hybrid torque levels to the electronic control module. Additionally, other rotary sensors can be used, for example, on the clutch shaft 105, to send signals to the electronic control module 124 to monitor the transmission 114 speed. The operative connection between the sensors and the electronic control module 124 can be made in any suitable manner, for example, wirelessly or by a hardwired electronic connection.

Even though most machines are designed to avoid resonance during the normal operating range, the engine 102 speed upon startup can still cause resonance as the engine attempts to overcome inertial forces and parasitic load in the powertrain 101. The following paragraphs describe several methods for preventing the machine 100 from experiencing resonance during machine startup.

Figure 2:
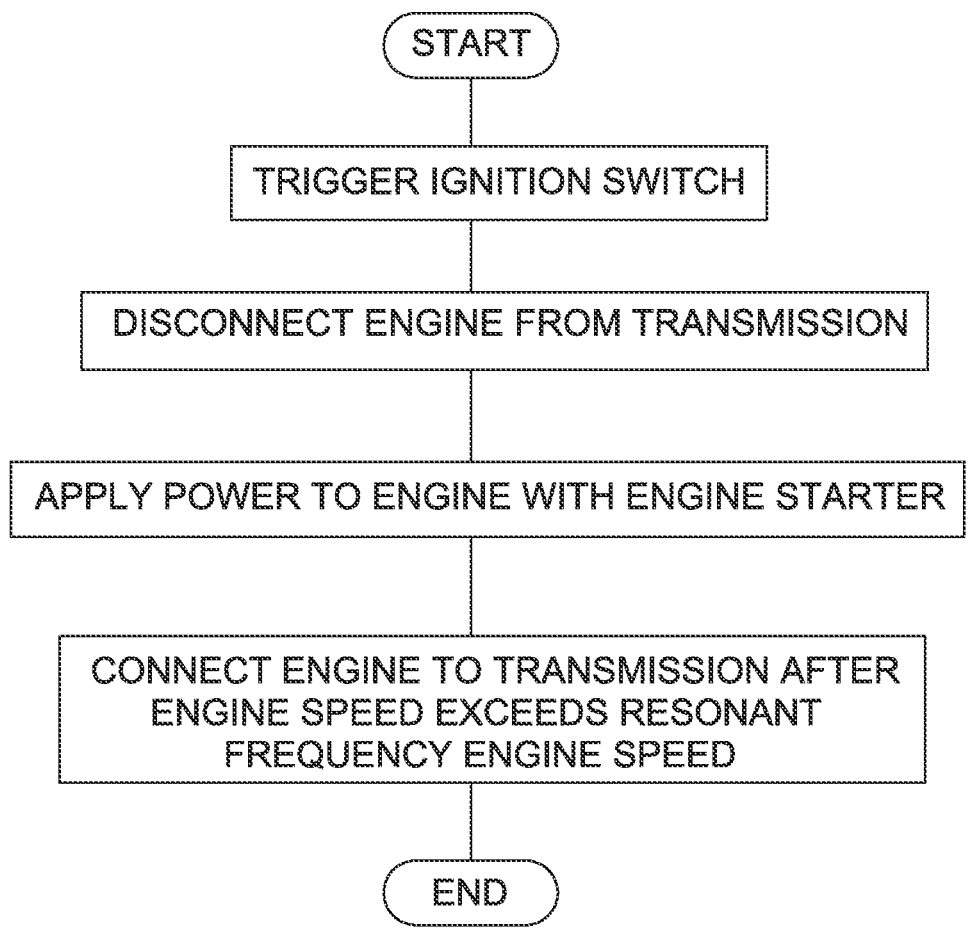
FIG. 2 is a flow chart illustrating an engine starting strategy in accordance with the disclosure.

One method for starting the machine 100, illustrated in FIG. 2, involves disengaging the clutch 112 as or after the ignition switch 106 is triggered, which disconnects the engine 102 from the transmission 114 and the auxiliary mechanisms 116. The ignition switch 106 triggers the engine starter 104 to apply power to the engine 102 to start the engine. With the clutch 112 disengaged, the engine 102 can be started alone without needing to overcome the downstream inertial forces and parasitic load of the transmission 114, the auxiliary mechanisms 116, and other powertrain 101 components. Additionally, when disconnected from the engine, the transmission 114 and other components are not subjected to the high torque amplitudes that occur at resonant frequency engine speeds. At some time after the engine 102 exceeds an engine speed that exceeds the resonant frequency engine speeds, the clutch 112 is engaged smoothly to enable the engine to apply power to the transmission 114 and the auxiliary mechanisms 116. In some embodiments, a rotational sensor 122 on the crankshaft 103 senses the engine 102 speed and signals an electronic control module 124. The electronic control module 124 determines the time when the engine 102 speed has exceeded the resonant frequency engine speed and commands the clutch 112 to engage. The electronic control module 124 can be any type of electronic control module, and the rotational sensor 122 can be a rotary encoder or any other suitable sensor. This method allows the engine 102 to speed quickly through the resonant frequency engine speeds while disconnected from the other powertrain 101 components to avoid subjecting the powertrain to resonance.

Figure 3:
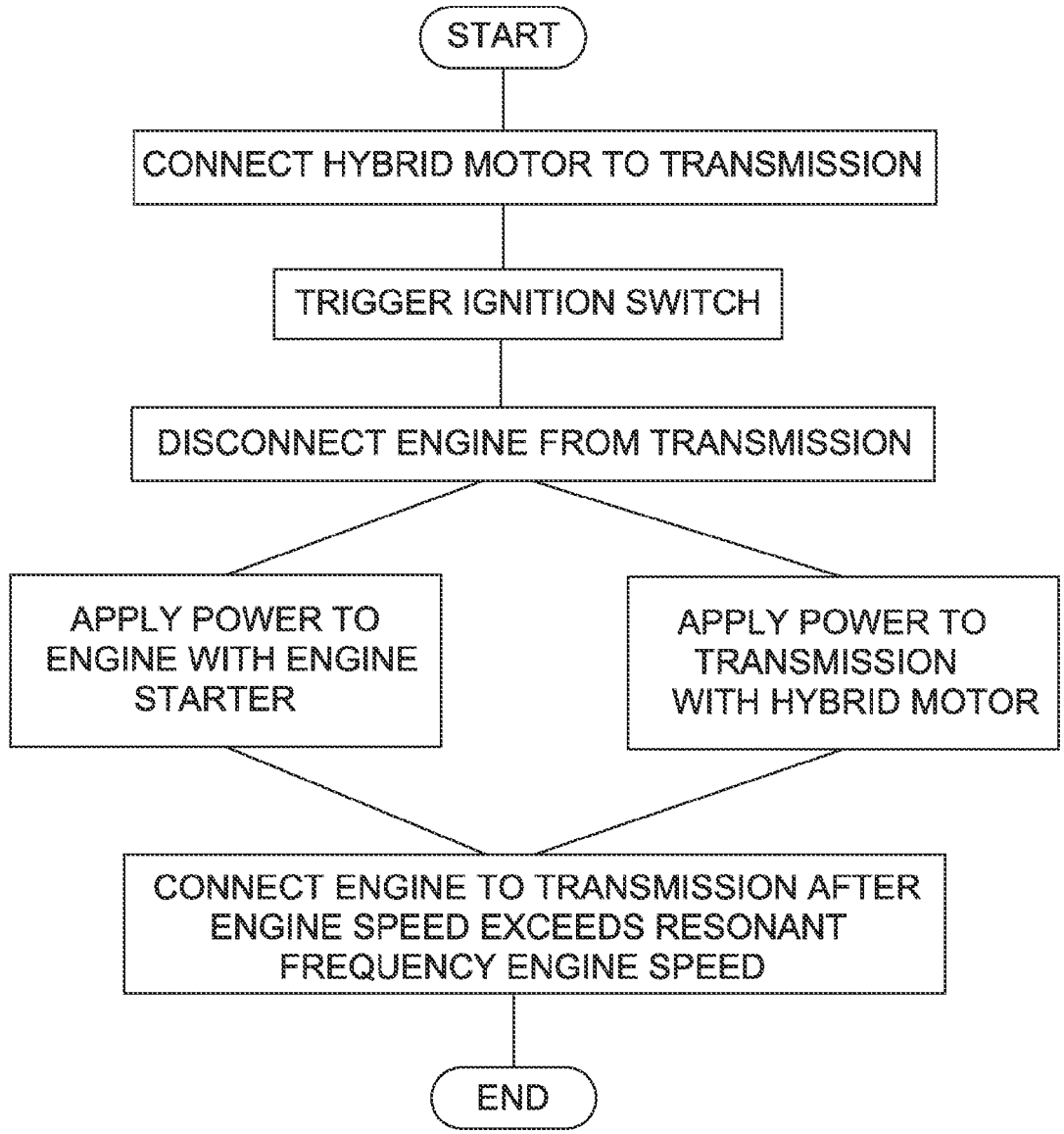
FIG. 3 is a flow chart illustrating another embodiment of an engine starting strategy in accordance with the disclosure.

An alternative method, illustrated in FIG. 3, involves connecting the hybrid motor 118 to the transmission 114 such that the hybrid motor can apply power to the transmission. As in the previous method, the clutch 112 disengages as or after the ignition switch 106 triggers the engine starter 104, disconnecting the engine 102 from the transmission 114 and auxiliary mechanisms 116. The engine starter 104 applies power to the engine 102. While the clutch 112 is disengaged and the engine 102 is not applying power to the transmission 114, the hybrid motor 118 draws on power from the stored energy source 120 and applies power to the transmission 114 and/or the auxiliary mechanisms 116. The hybrid motor 118 rotates the transmission 114 and/or auxiliary mechanisms 116 at least until a time when the engine 102 reaches an engine speed that exceeds the resonant frequency engine speed. At that time, the clutch 112 engages smoothly to allow the engine 102 to apply power to the transmission 114 and/or auxiliary mechanisms 116 either alone or in addition to the hybrid motor 118. Alternatively, the method involves engaging the clutch 112 at a time when the engine 102 has exceeded a resonant frequency engine speed and the transmission 114 has exceeded a resonant frequency transmission speed. This method allows the engine 102 to start alone and quickly increase in speed through the resonant frequency engine speeds without the burden of overcoming inertial forces and parasitic load in the other powertrain 101 components. Additionally, this method uses the hybrid motor 118 to rotate the transmission 114 and/or auxiliary mechanisms 116 while disconnected from the engine 102, which eases the connection to the engine and ensures that the transmission speed exceeds the resonant frequency transmission speed. The electronic control modules 124 of this disclosure may be of any conventional design having hardware and software configured to perform the calculations and send and receive appropriate signals to perform the engagement logic. The electronic control module 124 may include one or more controller units, and may be configured solely to perform the engagement strategy, or to perform the engagement strategy and other processes of the machine 100. The controller unit may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The arrangement disclosed herein has universal applicability in various other types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The industrial application of the methods for starting a machine that avoid effects of resonant frequencies as described herein should be readily appreciated from the foregoing discussion. The present disclosure may be applicable to any type of machine utilizing a powertrain that experiences resonant frequencies. It may be particularly useful in machines that include a hybrid motor that can apply power to components of the machine's powertrain.

The disclosure, therefore, may be applicable to many different machines and environments. One exemplary machine suited to the disclosure is an off-highway truck. Off-highway trucks have large components that burden the truck's engine during startup with large inertial forces and parasitic load. These large inertial forces and parasitic load may result in damaging torque amplitudes experienced by the machine components at the powertrain's resonant frequency. Thus, a method for starting a machine that avoids the effects of resonant frequencies is readily applicable to an off-highway truck.

Further, the methods above can be adapted to a large variety of machines. For example, other types of industrial machines, such as backhoe loaders, compactors, feller bunchers, forest machines, industrial loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:
1. A machine comprising:
a clutch adapted to engage and to disengage;
an engine operable at various engine speeds including a resonant frequency engine speed;
a transmission operatively connected to the engine through the clutch, the engine is adapted to apply power to the transmission when the clutch is engaged, and the engine is adapted to not apply power to the transmission when the clutch is disengaged;

an engine starter adapted to apply power to the engine;

an electronic control module configured to control the clutch to disengage when the engine starter applies power to the engine and to engage after an engine speed exceeds the resonant frequency engine speed; and a hybrid motor operatively connected to the transmission, the hybrid motor adapted to apply power to the transmission when the engine starter applies power to the engine until at least a time when the engine speed exceeds the resonant frequency engine speed.

2. The machine of claim 1, further comprising at least one auxiliary mechanism operatively connected to the engine through the clutch, the engine is adapted to apply power to the at least one auxiliary mechanism when the clutch is engaged, and the engine is not adapted to apply power to the at least one auxiliary mechanism when the clutch is disengaged.

3. The machine of claim 1, further comprising a rotary sensor operatively associated with the engine, the rotary sensor adapted to sense the engine speed.

4. The machine of claim 1 wherein:
the transmission is operable at various transmission speeds including a resonant frequency transmission speed; and
the clutch is adapted to engage after the engine speed exceeds the resonant frequency engine speed and a transmission speed exceeds the resonant frequency transmission speed.

5. The machine of claim 1, further comprising a rotary sensor operatively associated with the engine and the electronic control module and adapted to sense the engine speed, wherein the electronic control module is adapted to receive a signal from the rotary sensor and control the clutch to engage at the time when the engine speed exceeds the resonant frequency engine speed as indicated by the rotary sensor.

6. The machine of claim 1, further comprising at least one auxiliary mechanism operatively connected to the hybrid motor and operatively connected to the engine through the clutch, wherein:
the engine is adapted to apply power to the at least one auxiliary mechanism when the clutch is engaged, and the engine is adapted to not apply power to the at least one auxiliary mechanism when the clutch is disengaged; and
the hybrid motor is adapted to apply power to the engine until at least the time when the engine speed exceeds the resonant frequency engine speed.

7. The machine of claim 1, further comprising:
at least one auxiliary clutch adapted to engage and to disengage;
at least one additional auxiliary mechanism operatively connected to the engine through the at least one auxiliary clutch, the engine adapted to apply power to the at least one additional auxiliary mechanism when the at least one auxiliary clutch is engaged, and the engine is not adapted to apply power to the at least one additional auxiliary mechanism when the at least one auxiliary clutch is disengaged.

8. A method of starting a machine, the method comprising steps of:
providing an engine operable at various engine speeds including a resonant frequency engine speed;
operatively connecting an engine starter to the engine, the engine starter adapted to apply power to the engine;
operatively connecting a transmission to the engine through a clutch, the engine is adapted to apply power to the transmission when the clutch is engaged, and the engine is adapted to not apply power to the transmission when the clutch is disengaged;

disengaging the clutch when the engine starter applies power to the engine;

engaging the clutch after the engine speed exceeds the resonant frequency engine speed; and operatively connecting at least one auxiliary mechanism to the engine through the clutch, the engine is adapted to apply power to the at least one auxiliary mechanism when the clutch is engaged, and the engine is not adapted to apply power to the at least one auxiliary mechanism when the clutch is disengaged.

9. The method of claim 8, further comprising a step of operatively connecting at least one auxiliary mechanism to the engine through at least one auxiliary clutch, the engine is adapted to apply power to the at least one auxiliary mechanism when the at least one auxiliary clutch is engaged, and the engine is not adapted to apply power to the at least one auxiliary mechanism when the at least one auxiliary clutch is disengaged.

10. The method of claim 8, further including a step of sensing the engine speed with a rotary sensor operatively associated with the engine.

11. The method of claim 10, further including steps of:
sending a signal from the rotary sensor to an electronic control module operatively associated with the clutch; and
commanding the clutch with the electronic control module to engage at a time after the engine speed exceeds the resonant frequency engine speed.

12. A method of starting a machine, the method comprising steps of:
providing an engine operable at various engine speeds including a resonant frequency engine speed;
operatively connecting an engine starter to the engine, the engine starter adapted to apply power to the engine;
operatively connecting a transmission to the engine through a clutch, the engine is adapted to apply power to the transmission when the clutch is engaged, and the engine is adapted to not apply power to the transmission when the clutch is disengaged;
operatively connecting a hybrid motor to the transmission, the hybrid motor being adapted to apply power to the transmission;
applying power to the transmission with the hybrid motor when the engine starter applies power to the engine until at least a time when the engine speed exceeds the resonant frequency engine speed;
disengaging the clutch when the engine starter applies power to the engine; and
engaging the clutch after the engine speed exceeds the resonant frequency engine speed.

13. The method of claim 12 wherein the transmission is operable at various transmission speeds including a resonant frequency transmission speed; and further including a step of engaging the clutch after the engine speed exceeds the resonant frequency engine speed and the transmission speed exceeds the resonant frequency transmission speed.

14. The method of claim 12, further comprising steps of:
sensing the engine speed with a rotary sensor operatively associated with the engine;
sending a signal from the rotary sensor to an electronic control module operatively associated with the clutch; and commanding the clutch with the electronic control module to engage at the time after the engine speed exceeds the resonant frequency engine speed.

15. The method of claim 12, further including steps of:

operatively connecting the hybrid motor to at least one auxiliary mechanism;

operatively connecting the engine to the at least one auxiliary mechanism through the clutch, the engine being adapted to apply power to the at least one auxiliary mechanism when the clutch is engaged, and the engine being adapted to not apply power to the at least one auxiliary mechanism when the clutch is disengaged; and applying power to the at least one auxiliary mechanism with the hybrid motor when the engine starter applies power to the engine until at least the time when the engine speed exceeds the resonant frequency engine speed.

16. The method of claim 12, further including a step of operatively connecting at least one auxiliary mechanism to the engine through the clutch, the engine is adapted to apply power to the at least one auxiliary mechanism when the clutch is engaged, and the engine is not adapted to apply power to the at least one auxiliary mechanism when the clutch is disengaged.

17. The method of claim 12, further comprising a step of operatively connecting at least one auxiliary mechanism to the engine through at least one auxiliary clutch, the engine is adapted to apply power to the at least one auxiliary mechanism when the at least one auxiliary clutch is engaged, and the engine is not adapted to apply power to the at least one auxiliary mechanism when the at least one auxiliary clutch is disengaged.

* * * * *